(12) United States Patent
Yoshimura

(10) Patent No.: US 7,675,459 B2
(45) Date of Patent: Mar. 9, 2010

(54) EQUIVALENT TIME SAMPLING RADAR

(75) Inventor: Naohide Yoshimura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 24 days.

(21) Appl. No.: 12/206,110

(22) Filed: Sep. 8, 2008

(65) Prior Publication Data

US 2009/0066561 A1 Mar. 12, 2009

(30) Foreign Application Priority Data

Sep. 11, 2007 (JP) .............................. 2007-235385

(51) Int. Cl.
*G01S 13/00* (2006.01)
(52) U.S. Cl. .................. 342/159; 342/175; 342/186
(58) Field of Classification Search .................. 342/159, 342/175, 186
See application file for complete search history.

(56) References Cited

U.S. PATENT DOCUMENTS 6,462,705 B1 * 10/2002 McEwan .................... 342/175

2005/0078735 A1 * 4/2005 Baker et al. .................. 375/130
2006/0274871 A1 * 12/2006 Griessbaum ................ 375/354

FOREIGN PATENT DOCUMENTS

JP 2005-24563 A 1/2005
JP 2006-177985 A 7/2006

* cited by examiner

*Primary Examiner*—Thomas H Tarcza
*Assistant Examiner*—Timothy A Brainard
(74) *Attorney, Agent, or Firm*—Darby & Darby, P.C.

(57) ABSTRACT

A dither clock generating section 1 generates a dither clock. A transmission pulse generating section 2a generates a transmission pulse emitted to the outside from a transmitting antenna 2c on the basis of the dither clock. A sample hold section 6 samples a reception pulse, received by a receiving antenna 3a, on the basis of a sample pulse obtained by time sweeping of the changing timing of the dither clock, so as to produce a long-period reception pulse that is obtained by expanding the reception pulse on a time axis.

9 Claims, 8 Drawing Sheets

FIG. 8
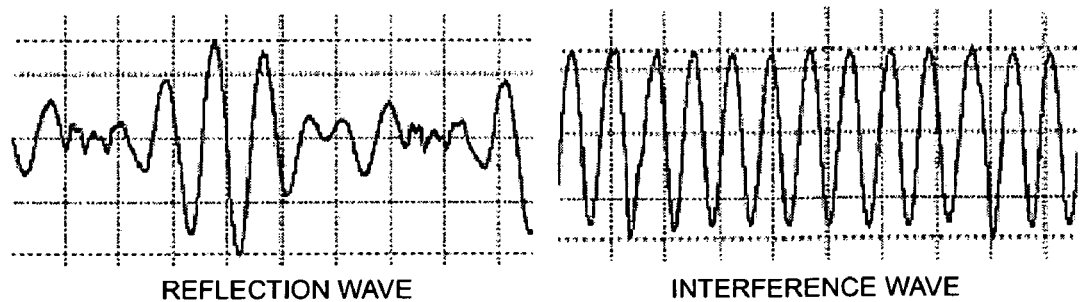
REFLECTION WAVE        INTERFERENCE WAVE
(a)
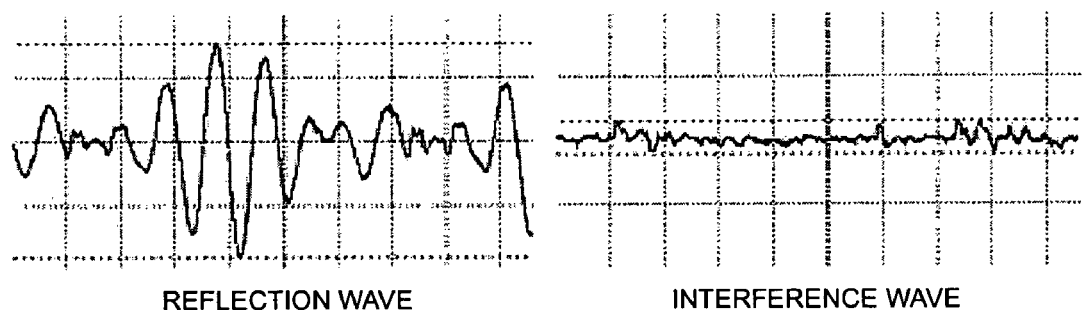
REFLECTION WAVE        INTERFERENCE WAVE
(b)

US 7,675,459 B2

EQUIVALENT TIME SAMPLING RADAR

CROSS-REFERENCE TO RELATED APPLICATIONS

The disclosure of Japanese Patent Application No. 2007-235385 filed on Sep. 11, 2007 including the specification, drawing and abstract is incorporated herein by reference in its entirety.

BACKGROUND OF THE INVENTION

1. Field of the Invention

The present invention relates to an equivalent time sampling radar, and more particularly to a cancellation of interference between radars, or a cancellation of an interference wave from an electric wave of other broadcasting or that of other communication.

2. Description of the Related Arts

In a general equivalent time sampling radar, a distance is calculated on the basis of a roundtrip propagation time that is a time from when a transmission pulse signal is reflected on a target, which is a subject to the distance-measuring, to when the reflection signal is received. When another radar is present in the distance-measuring range of the above general radar, it is difficult for the general radar to determine whether the reception pulse signal is the signal (reflection wave) transmitted from the own radar or the signal (interference wave) transmitted from another radar, which causes the deterioration in the distance-measuring accuracy. When the timing of the sampling is synchronous with the electric wave of another broadcasting, that of communication, or the like, there is a high possibility that interference occurs between the reception signal and the signal transmitted from another radar.

JP-A-2005-24563 discloses a short-range vehicular radar system including, in a programmable digital receiver, a non-linear filter (adaptive interference filter) for rejecting a radar pulse received from another radar. Specifically, the receiver cancels the interference wave (i.e., the transmission pulse transmitted from another radar) by the programmable non-linear filter. Thus, the pulse that appears to be statistically much larger than other pulses received by the receiver is cancelled.

JP-A-2006-177985 discloses a technique capable of preventing a malfunction due to the interference from another radar by using a pseudo-random signal generator in a pulse radar apparatus with a short-range detection limit and a high distance resolution. Specifically, a signal is generated by using a first signal that is a basic signal in generating a transmission pulse, a second signal for phase modulation of a frequency lower than the first signal, and a pseudo-random signal, for amplitude modulation, generated at an intermediate frequency between the first and second signals, and the generated signal is delayed, whereby a control pulse signal is generated. A gate operation for the reception signal is performed based upon the control pulse signal. A noise band can be restricted by the cutoff using a narrow band filter, and a malfunction of detecting wrong targets by the interference of other radar units can be suppressed by the spread spectrum system.

However, in JP-A-2005-24563 and JP-A-2006-177985, the transmission timing of the transmission pulse or the sampling timing of the reception pulse depends upon a reference clock, thereby entailing a problem that a satisfactory effect of reducing the interference cannot be expected for electric waves transmitted at the frequency or timing that happens to be synchronous with the reference clock (the interference wave that is the subject to be treated in JP-A-2005-24563 and JP-A-2006-177985 is not the one described above to begin with)

SUMMARY OF THE INVENTION

The present invention is accomplished in view of the above-mentioned circumstance, and aims to provide an equivalent time sampling radar that can separate an interference wave that happens to be synchronous with the reference clock so as to effectively sample the transmission pulse from the own radar.

In order to solve the foregoing problem, the present invention provides an equivalent time sampling radar provided with a dither clock generating section, a transmission pulse generating section, and a sample hold section. The dither clock generating section generates a dither clock obtained by varying the timing of the rise and the timing of the fall of the reference clock that is repeatedly turned on or off at a constant period, thereby producing a dither clock. The transmission pulse generating section generates a transmission pulse that is emitted to the outside from a transmitting antenna, at every timing when the dither clock rises or falls. The sample hold section performs a sampling to a reception pulse that is received by a receiving antenna on the basis of a sample pulse that is obtained by time sweeping of the timing of the rise or the fall of the dither clock, so as to generate a long-period reception pulse obtained by expanding the reception pulse on a time axis.

In the present invention, the dither clock generating section preferably includes a reference clock generating section and a dither section. The reference clock generating section generates the reference clock. The dither section randomly varies the changing timing of the reference clock on the basis of a noise, and generates the dither clock.

In the present invention, the dither section may randomly vary the changing timing of the reference clock within a predetermined jitter margin specified by the frequency of the transmission pulse or the frequency of the reception pulse. Further, the dither section may randomly vary the changing timing of the reference clock in such a manner that the changing timing of the random clock forms a probability distribution within the above-mentioned predetermined margin.

In the present invention, the dither section may include a noise generator that generates a noise, and a synthesizer that binarizes a synthetic waveform, which is obtained by synthesizing the reference clock generated at the reference clock generating section and the noise generated by the noise generator, at a slice level, so as to output the dither clock. In this case, the dither section may further include a dither adjuster that adjusts the changing timing of the dither clock by adjusting the frequency of the noise generated by the noise generator according to the frequency of the reception pulse or the frequency of the transmission pulse.

In the present invention, the apparatus preferably include an interference wave canceling section to which the long-period reception pulse generated at the sample hold section is input and that cancels the pulses other than the transmission pulse as the interference wave. For example, a low-pass filter or a statistical processing section can be employed as the interference wave canceling section. The low-pass filter passes only a predetermined low-frequency band of the long-period reception pulse. On the other hand, the statistical processing section performs a statistical process on the basis of the sampling over a plurality of periods, and cancels the interference wave that has low temporal correlation with the sample pulse.

According to the present invention, the emission of the transmission pulse to the outside and the sampling of the reception pulse are synchronously controlled on the basis of the changing timing of the dither clock. Since the dither clock is time-diffused with its changing timing being random, the temporal correlation between the transmission pulse generated based upon the dither clock and the interference wave becomes low. By reducing the temporal correlation between both of them as described above, the interference wave, which happens to be synchronous with the reference clock, can be separated, whereby the transmission pulse from the own radar can effectively be sampled.

BRIEF DESCRIPTION OF THE DRAWINGS

FIGS. 8A and 8B are charts showing a simulation waveform of the interference wave.

DETAILED DESCRIPTION OF THE PREFERRED EMBODIMENTS

Model of Cancellation of Interference Wave

Figure 1:
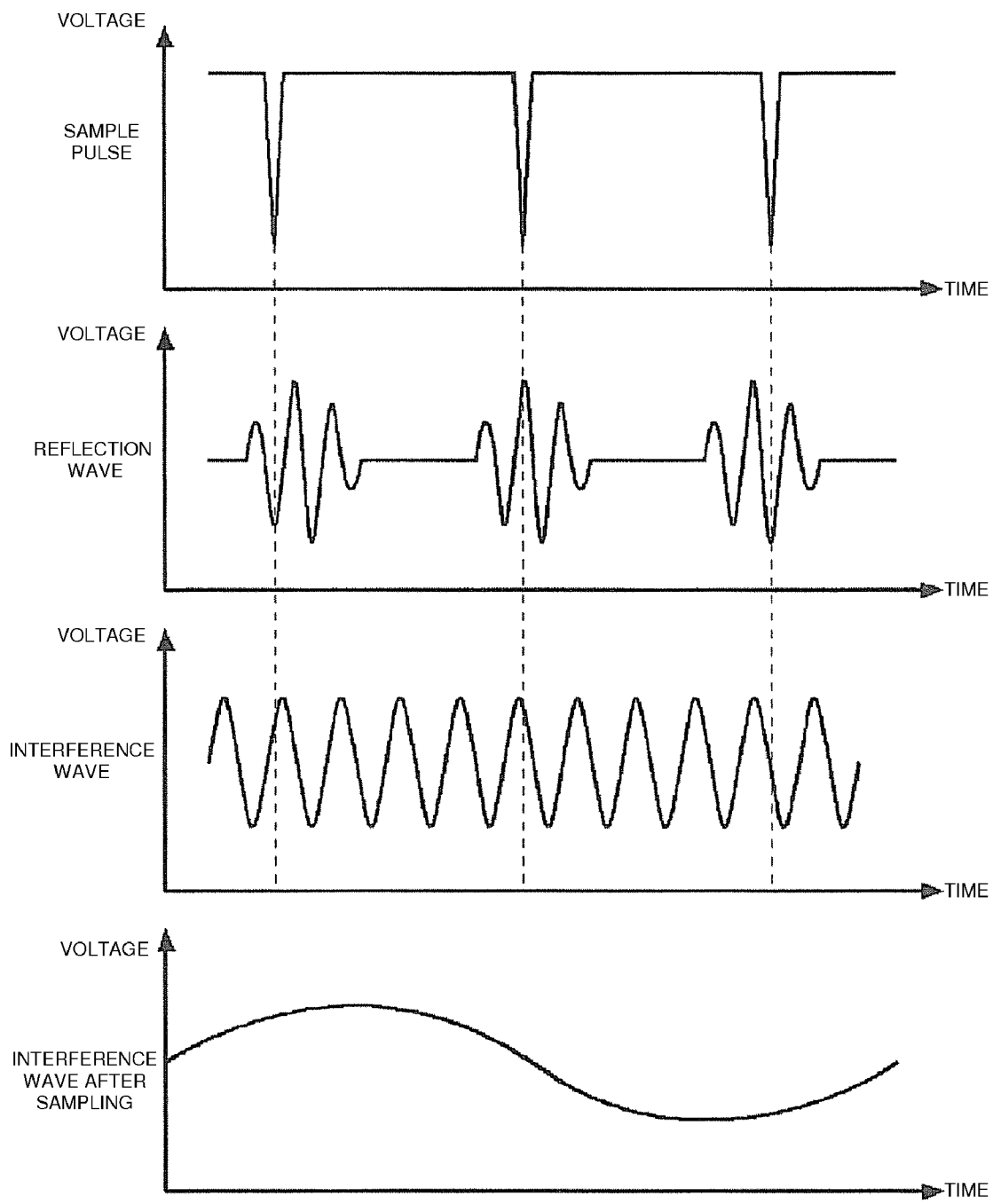
FIG. 1 is an explanatory view of a conventional sample pulse.

Prior to the explanation of the specific configuration of an equivalent time sampling radar according to the present embodiment, a mechanism of the cancellation of an interference wave according to the present embodiment will firstly be explained with reference to FIGS. 1 and 2. FIG. 1 is an explanatory view of a conventional sample pulse for showing a relationship between a sample pulse, a reflection pulse, an interference pulse, the reflection pulse and the interference pulse constitute a reception pulse, and an interference wave after the sampling. The sample pulse specifies the changing timing at which the voltage is sampled from the reception pulse, which is a subject to be extracted. In this case, the voltage of the reception pulse is sampled at the timing of the rise (from OFF to ON) or the fall (from OFF to ON) of the sample pulse, (in the present embodiment, the sampling timing is the timing of the fall from H-level).

The reception pulse is a signal which is the synthesized wave of the reflection wave and the interference wave. In FIG. 1, the reflection wave and the interference wave are illustrated as separated for the sake of convenience of the explanation. In the reception pulse received by the receiving system, the reflection wave is the signal of the transmission pulse that is transmitted from the own radar and reflected by a target. In the reception pulse received by the receiving system, the interference wave is a signal of the transmission pulse transmitted from the systems other than the own radar. The interference wave assumed in the present embodiment has a periodic waveform, and it is a signal synchronous with a later-described reference clock.

When the frequency of the interference wave is close to n times (n is a natural number) the frequency of the sample pulse, the temporal correlation between both of them becomes high, so that they cannot be distinguished in the equivalent time sampling. This is because, at the time of the equivalent time sampling, not only the desired reflection wave but also the interference wave can be expanded on a time axis. As a result, the interference wave after the sampling is superimposed on the reflection wave after the sampling (video waveform).

Figure 2:
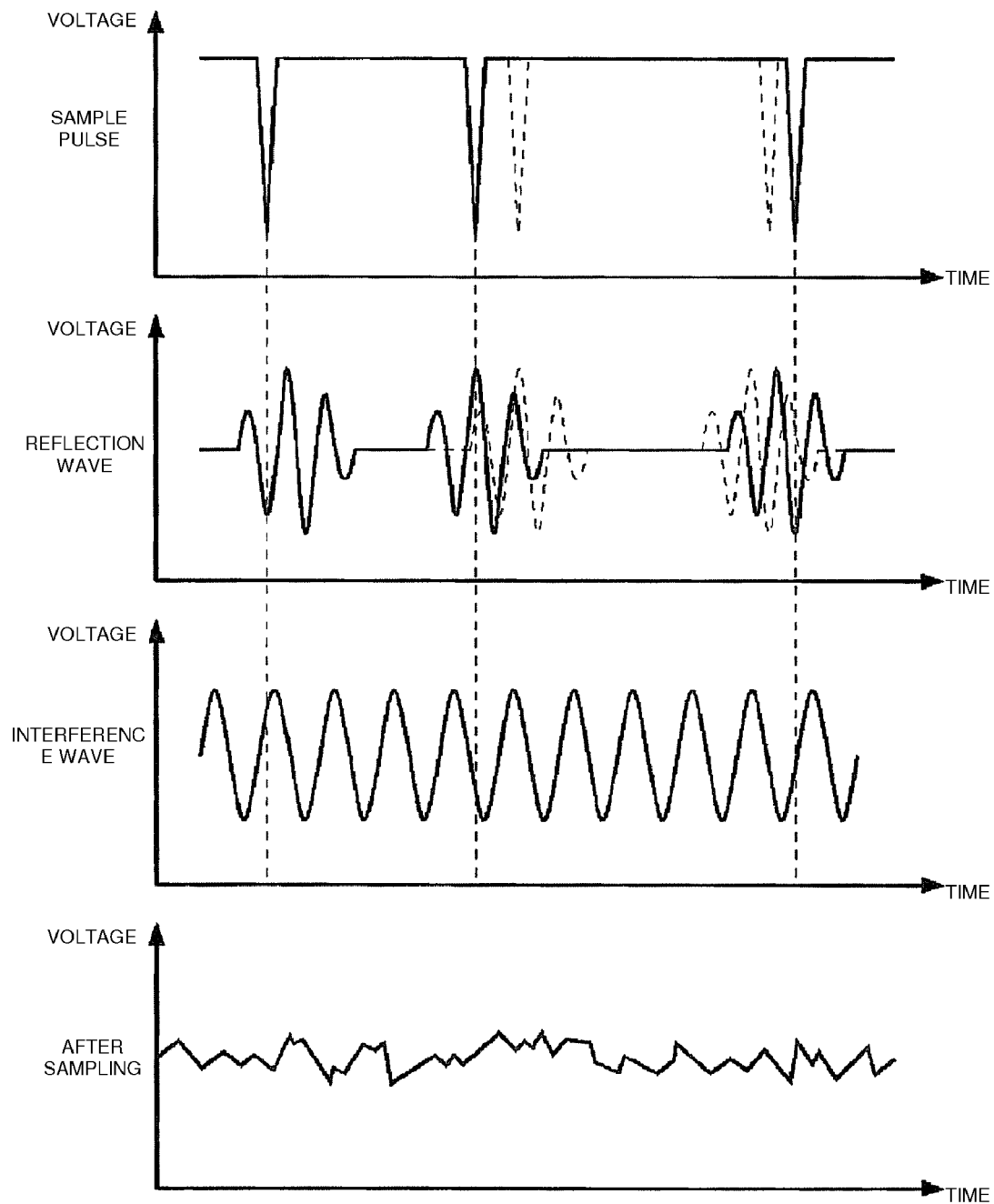
FIG. 2 is an explanatory view of a sample pulse by dithering.

FIG. 2 is an explanatory view of a sample pulse by dithering according to the present embodiment. The term "dithering" means here a technique for randomly varying the changing timing of the clock by intentionally applying a jitter (not a voltage noise, but a temporal noise) to the sample pulse that is a clock signal. In this case, the changing timing of the clock randomly varies in the sample pulse, so that the temporal correlation between the sample pulse and the interference wave is low even if the frequency of the interference wave is equal to the frequency of the reception signal. Therefore, the interference wave after the sampling becomes a noise having randomness. The interference wave after the sampling appears as a high-frequency noise component in the synthetic waveform of the reflection wave after the sampling and the interference wave after the sampling. Accordingly, the interference wave is cancelled by performing a filtering for canceling the high-frequency noise component, whereby the signal including the reflection wave as a main component can effectively be extracted.

(Equivalent Time Sampling Radar)

Figure 3:
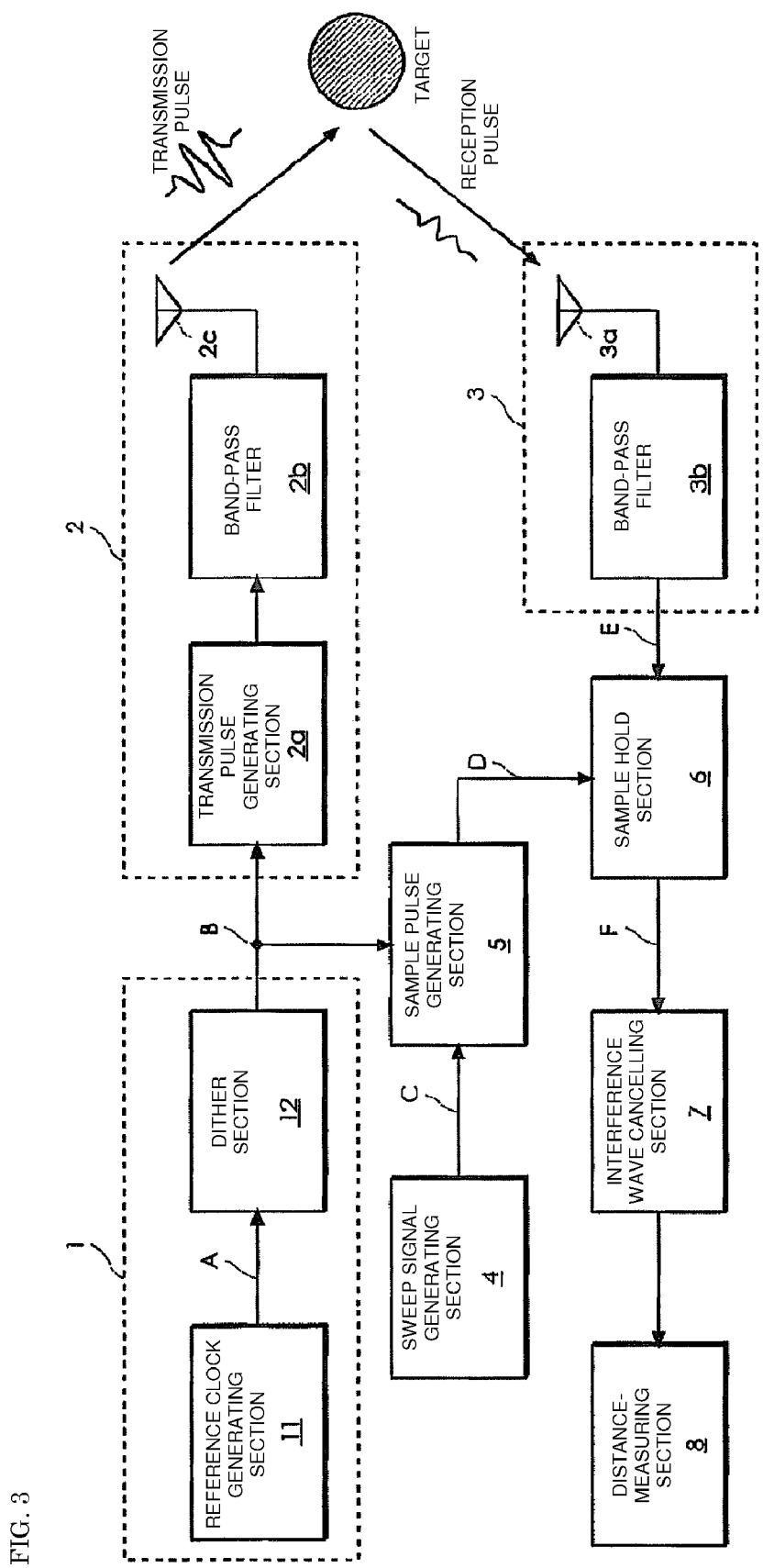
FIG. 3 is a block diagram of an equivalent time sampling radar.
Figure 4:
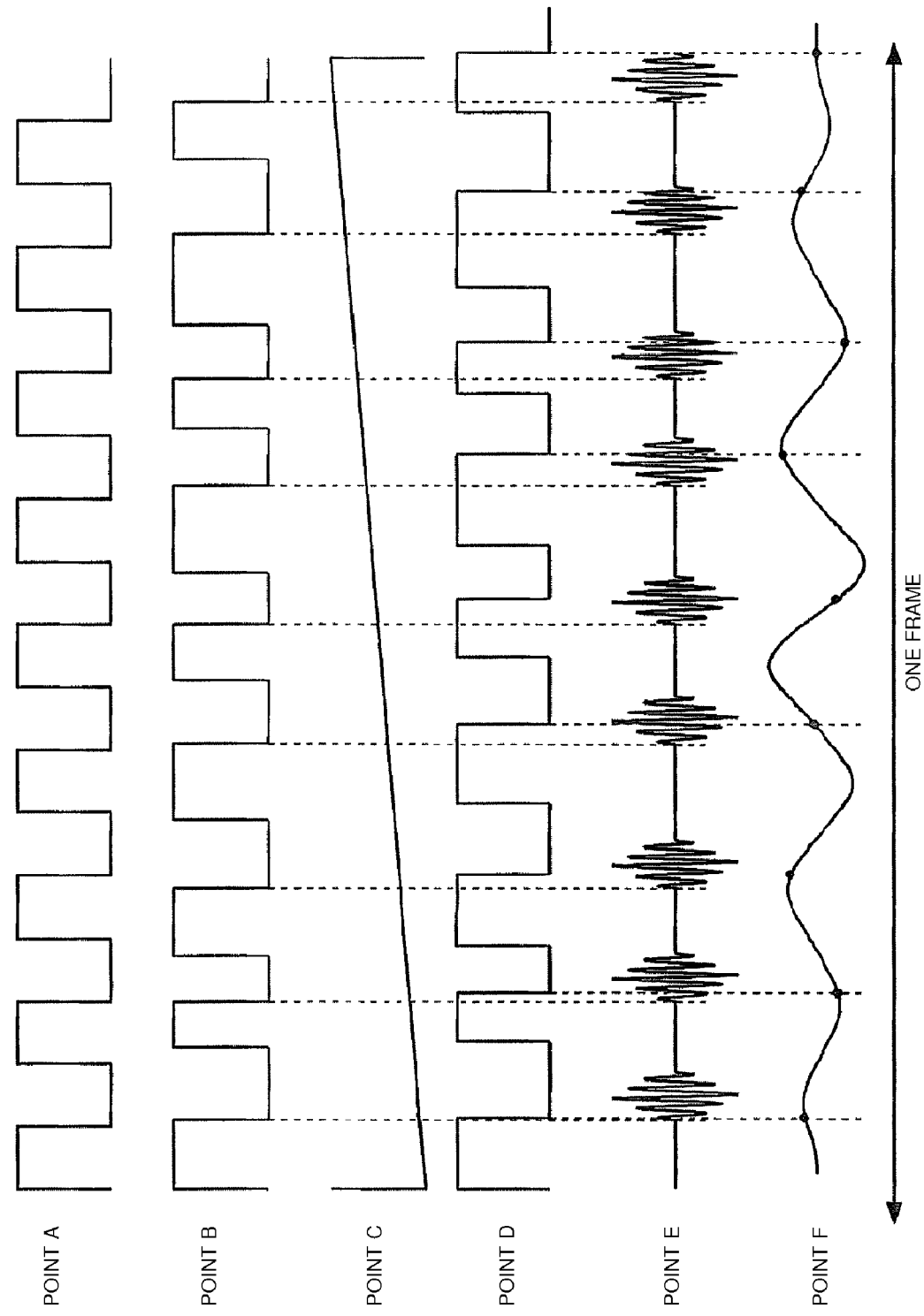
FIG. 4 is a view showing signal waveforms at the points A to F shown in FIG. 3.

FIG. 3 is a block diagram of an equivalent time sampling radar having installed thereto the technique shown in FIG. 2. The equivalent time sampling radar includes a dither clock generating section 1, a transmitting section 2, a receiving section 3, a sweep signal generating section 4, a sample pulse generating section 5, a sample hold section 6, an interference wave canceling section 7, and a distance-measuring section 8. FIG. 4 is a view showing signal waveforms at the points A to F shown in FIG. 3.

The dither clock generating section 1 generates a dither clock by randomly time-diffusing the changing timing of a reference clock that is repeated at a fixed period. As described above, the dither clock is generated on the basis of the dithering, and in order to realize this, the dither clock generating section 1 is composed of a reference clock generating section 11 and a dither section 12. The reference clock generating section 11 generates a rectangular reference clock (point A in FIG. 4) whose ON and OFF is repeated at a fixed period. The reference clock has a repeated waveform in which a H-level (ON) and a L-level (OFF) are alternately switched at equal intervals. In the present embodiment, the timing when the reference clock is changed from the H-level to the L-level is referred to as a "changing timing". The dither section 12 randomly varies the changing timing of the reference clock, which is generated at the reference clock generating section 11, on the basis of the noise, thereby generating a rectangular dither clock (point B in FIG. 4).

The transmitting section 2 emits the transmission pulse to the outside at the changing timing of the dither clock, which is generated at the dither clock generating section 1, i.e., at the timing when the dither clock is changed from the H-level to the L-level. The transmission section 2 is mainly composed of a transmission pulse generating section 2a, a band-pass filter 2b, and a transmitting antenna 2c. The transmission pulse generating section 2a generates a transmission pulse that is emitted to the outside from the transmitting antenna 2c at every changing timing of the dither clock that is generated at the dither clock generating section 1. Specifically, the transmission pulse is generated at one shot at the timing of the fall of the dither clock input to the transmission pulse generating section 2a. The transmission pulse generated at the transmission pulse generating section 2a is emitted to the outside from the transmitting antenna 2c through the band-pass filter 2b that is provided for restricting the transmission pulse within the communication band prescribed by a domestic legal regulation.

The receiving section 3 receives a reception pulse including a pulse reflected by a target T (reflection pulse) among the pulses emitted from the transmitting section 2 (point E in FIG. 4). The receiving section 3 is mainly composed of a receiving antenna 3a and a band-pass filter 3b. The receiving antenna 3a receives pulses from the outside as a reception pulse. The band-pass filter 3b is provided to cancel exogenous electromagnetic-noises contained in the reception pulse or to prevent the leakage of the sample pulse generated at the sample pulse generating section 5. The reception pulse passing through the band-pass filter 3b is input to the sample hold section 6.

The sweep signal generating section 4 repeatedly generates a sweep signal (point C in FIG. 4), which becomes a ramp wave, according to the period of the above-mentioned reference clock. The voltage level of the ramp wave linearly increases until the number of times of the rise of the reference clock reaches a predetermined number of times, and is reset to zero at the point when the number of the period of the reference clock reaches the predetermined number. The sample pulse generating section 5 generates a rectangular sample pulse (point D in FIG. 4) on the basis of the sweep signal generated at the sweep signal generating section 4 and the dither clock generated at the dither clock generating section 1. Specifically, the generation of the sample pulse is achieved by delaying (expanding) the dither clock, which is generated at the dither clock generating section 1, according to the voltage indicated by the sweep signal generated at the sweep signal generating section 4. In the present embodiment, as the voltage of the sweep signal increases, the delay amount of the dither clock increases.

The sample hold section 6 temporarily holds the voltage of the reception pulse received by the receiving section 3 at the changing timing of the sample pulse generated by the sample pulse generating section 5, in order to perform the equivalent time sampling. With this, a long-period reception pulse (point F in FIG. 4) obtained by expanding the reception pulse on the time axis is generated. The sample timing of the reception pulse is the timing of the fall of the sample pulse. The generated long-period reception pulse is used for the distance-measuring of the target T.

The interference wave canceling section 7 handles the input long-period reception pulse as a subject to be processed, and cancels the pulses other than the transmission pulse as the interference wave (the one synchronized with the reference clock) A low-pass filter that passes only a predetermined low-frequency band in the long-period reception pulse can be employed as the interference wave canceling section 7, for example. The interference wave contained in the long-period reception pulse has low temporal correlation with the changing timing of the sample pulse, so that it appears as a high-frequency component whose frequency is higher than that of the reflection wave or the like, as indicated by the interference wave after the sampling shown in FIG. 2. Therefore, by canceling the high-frequency component, which is the interference wave, by the low-pass filter, the original reflection wave passing as the low-frequency component can effectively be extracted. Then, the long-period reception pulse through the low-pass filter is subject to an amplification and digitization.

A statistical processing section that cancels the interference wave by the statistical process based upon the sampling over a plurality of periods may be employed as the interference wave canceling section 7. Specifically, the long-period reception pulses for a plurality of periods are obtained, and the average of the long-period reception pulses is calculated. The interference waves contained in the respective long-period reception pulses have randomness, so that they do not have the same value. Therefore, the interference wave can be cancelled by performing the statistical process described above.

The distance-measuring section 8 performs a distance-measuring of the target T (obstacle, or the like), which is a subject of the distance-measuring, on the basis of the long-period reception pulse passing through the interference canceling section 7. As is well known, the distance to the target T is uniquely calculated on the basis of the time value at which a positive peak or a negative peak attributed to the obstacle is formed.

Figure 5:
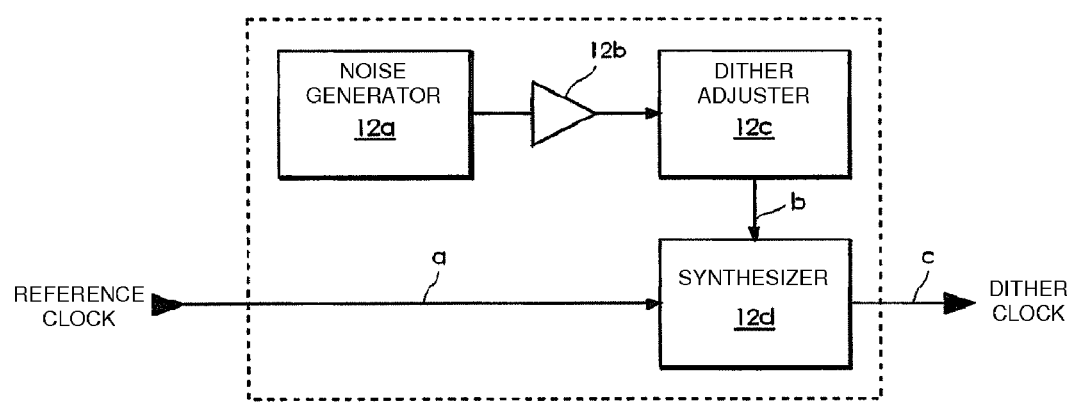
FIG. 5 is a block diagram of a dither section.
Figure 6:
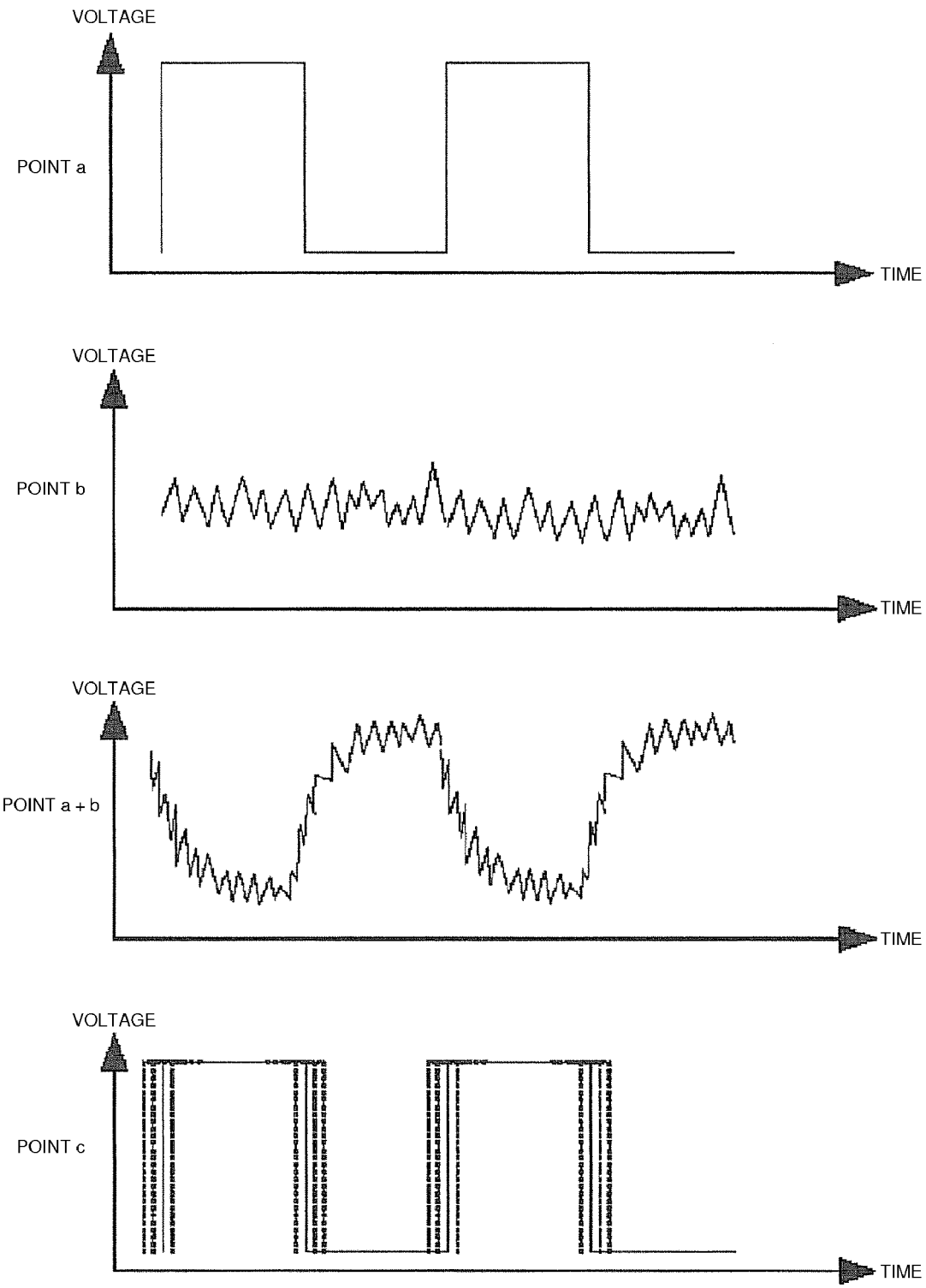
FIG. 6 is a waveform chart showing waveforms at the points a to c in FIG. 5.

FIG. 5 is a block diagram of the dither section 12, and FIG. 6 is a waveform chart at points a to c in FIG. 5. The dither section 12 includes a noise generator 12a, an amplifier 12b, a dither adjuster 12c, and a synthesizer 12d. The noise generator 12a generates a random noise. An avalanche noise of a transistor can be used as the noise, for example. The amplifier 12b amplifies the noise generated by the noise generator 12a. The dither adjuster 12c adjusts the frequency of the noise generated by the noise generator 12a according to the frequency of the reception pulse or the frequency of the transmission pulse (point b in FIG. 6). The frequency of the noise is adjusted to adjust the changing timing of the dither clock.

The synthesizer 12d generates, on the basis of the noise amplified by the amplifier 12b, a dither clock (point c in FIG. 6) obtained by randomly varying the jitter of the changing timing of the reference clock (point a in FIG. 6) generated by the reference clock generating section 11. The generation of the dither clock is carried out in a CR integration circuit composed of a capacitor and a resistance element. In a case where the both waveforms are synthesized, a synthetic waveform is formed in which the noise is superimposed on the rectangular wave that is incompletely integrated, as shown by the point a+b in FIG. 6. This synthetic waveform is binarized at a predetermined slice level (threshold value) with the use of a Schmitt trigger inverter, or the like. Accordingly, the dither clock to which the random jitter is added is generated as shown by the point c in FIG. 6. The random jitter has a temporal variation (randomness) since the avalanche noise generated by the noise generator 12a is used.

In the present embodiment, the reference clock generating section 11 and the dither section 12 are separated, and it is configured such that the dither section 12 adds the jitter to the reference clock generated by the reference clock generating section 11. With this configuration, the minimum required function as a pulse radar can be assured and secured (fail safe), even when the dither section 12 does not operate as the dither section 12 due to the breakdown of any one of the noise generator 12a, the amplifier 12b and the dither adjuster 12c.

Figure 7:
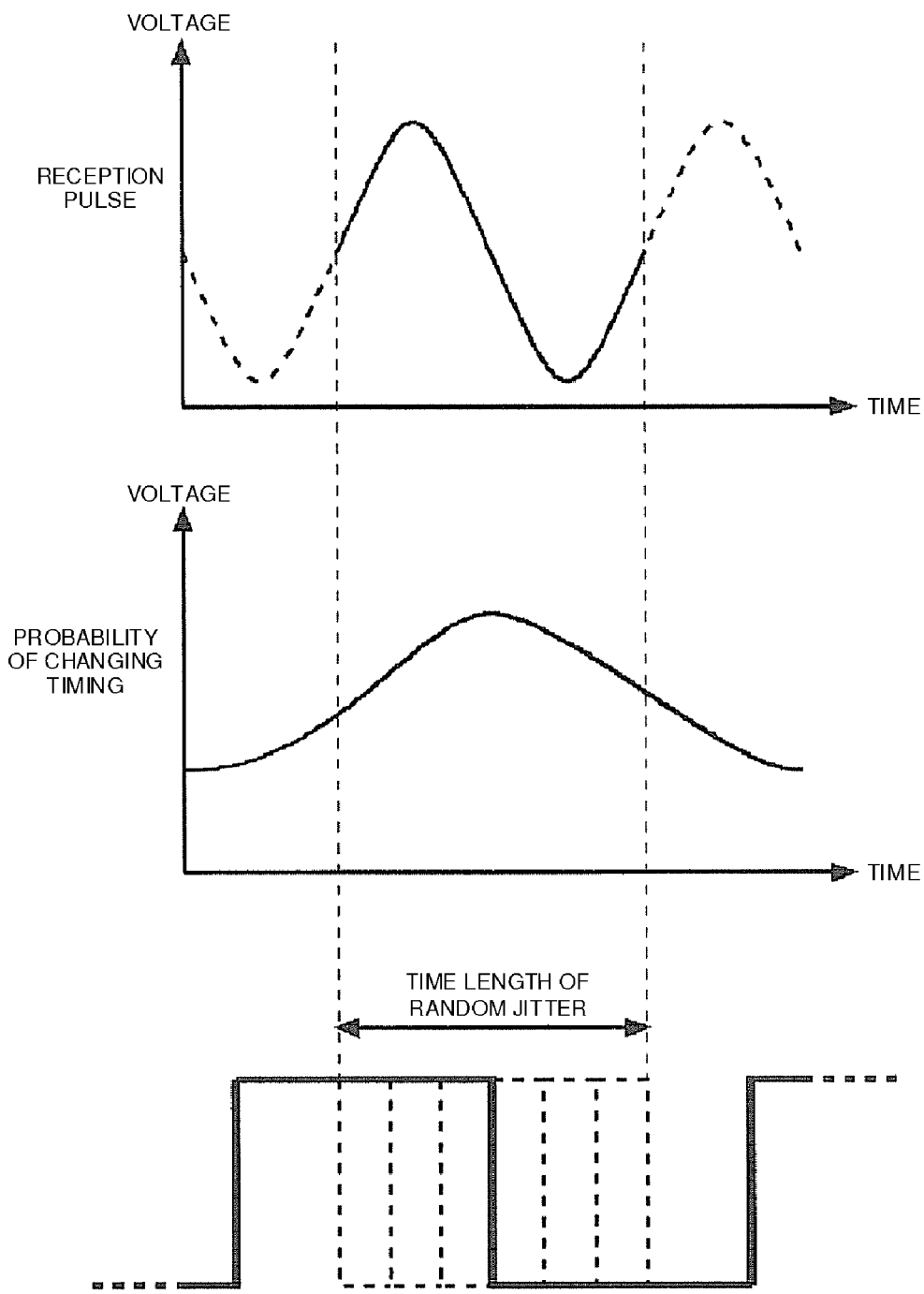
FIG. 7 is an explanatory view of the dither clock.

FIG. 7 is an explanatory view of the dither clock. The dither section 12 generates the dither clock within the jitter margin specified by the frequency of the transmission pulse or the frequency of the reception pulse. The time length of the random jitter generated by the dither section 12 is set to be at least not less than one period of the lowest frequency of the reception pulse (specifically, the reception pulse passing through the band-pass filter 3b). This is to suppress the interference in the frequency band of the reception pulse. The above-mentioned one period corresponds to the minimum necessary jitter amount for diffusing the interference wave. The dither section 12 generates the dither clock in such a manner that the dither clock jitter forms a predetermined probability distribution (including the case of being probabilistically equal) within the specified period. The changing timing of the dither clock depends upon the probability distribution (e.g., normal distribution) in which the middle point within the specified period exhibits high probability. The time length of the random jitter may be set to be at least not less than one period of the lowest frequency of the transmission pulse emitted from the transmitting antenna 2c, in addition to the reception pulse.

FIGS. 8A and 8B are charts showing a simulation waveform of the interference wave. FIG. 8A shows the waveform of the long-period reception pulse (reflection wave, interference wave) sampled by a conventional method, while FIG. 8B shows the waveform of the long-period reception pulse sampled by the method according to the present embodiment. The long-period reception pulse generated at the sample hold section 6 has a waveform obtained by synthesizing the reflection wave and the interference wave. The waveforms of the reflection waves in the conventional method and the method according to the present embodiment are similar to each other. The interference wave according to the conventional method is shaped as a sine wave, while the interference wave according to the method of the present embodiment is shaped as a random noise.

As described above, according to the present invention, the emission of the transmission pulse to the outside and the sampling of the reception pulse are synchronously controlled on the basis of the timing of the rise or fall of the dither clock. Since the jitter of the dither clock randomly varies, the temporal correlation between the transmission pulse generated on the basis of the dither clock and the interference wave (the interference wave itself has low temporal correlation with the dither clock) becomes low.

As a result of lowering the correlation between both of them, the component of the interference wave contained in the long-period reception pulse generated at the sample hold section 6 appears as a noise having randomness and high-frequency property. Therefore, the component of the interference wave can be cancelled by the interference wave canceling section 7 such as a low-pass filter or the like. Consequently, the interference wave that happens to be synchronous with the reference clock can be separated, whereby the transmission pulse from the own radar can effectively be sampled.

In the present embodiment, the equivalent time sampling amount may be increased in order to enhance the performance (cancellation ratio) of canceling the interference wave. Thus, the influence of the interference wave happening to be synchronous with the sample pulse can be more reduced.

The sample amount necessary for obtaining the long-period reception pulse of one period (one frame) can also be used with the equivalent time sampling by setting the sample amount to be substantially constant by the dithering of the dither adjuster 12c.

Although the avalanche noise is used as the noise generated by the noise generator 12a in the present embodiment, the present invention is not limited thereto. A random noise that does not depend upon the reference clock, such as a thermal noise or zener noise may be employed.

The sample pulse generated by the sample pulse generating section 5 is generated on the basis of the sweep signal in the present embodiment. However, it suffices in the present invention that the equivalent time sampling can be performed to the reception pulse according to the changing timing of the dither clock. Specifically, the changing timing of the dither clock may sequentially be put ahead/delayed at a fixed rate or randomly be changed at every period of the generation of the sample pulse with reference to the dither clock. For example, a sample pulse that falls at times $\pm\delta$, $\pm2\delta$, $\pm3\delta$, ..., from the timing t of the fall of the dither clock may be formed. Further, a sample pulse that falls at times $+\delta$, $-2\delta$, $+3\delta$, ..., from the timing t of the fall of the dither clock may be formed.

What is claimed is:

1. An equivalent time sampling radar comprising:
   a dither clock generating section that generates a dither clock that is repeated randomly;
   a transmission pulse generating section that generates a transmission pulse that is emitted to the outside from a transmitting antenna on the basis of the dither clock; and
   a sample hold section that performs a sampling to a reception pulse that is received by a receiving antenna on the basis of a sample pulse that is obtained by time sweeping of the timing of the rise or the fall of the dither clock, so as to generate a long-period reception pulse by expanding the reception pulse on a time axis.

2. The equivalent time sampling radar according to claim 1, wherein
   the dither clock generating section includes:
   a reference clock generating section that generates a reference clock that repeatedly rises and falls at a constant period; and
   a dither section that randomly varies a changing timing of the reference clock, and generates the dither clock.

3. The equivalent time sampling radar according to claim 2, wherein
   the dither section randomly varies the changing timing of the reference clock within a predetermined jitter margin specified by one of the frequency of the transmission pulse and the frequency of the reception pulse.

4. The equivalent time sampling radar according to claim 3, wherein
   the dither section randomly varies the changing timing of the reference clock in such a manner that the jitter at the rise or the fall of the dither clock forms a predetermined probability distribution within the predetermined margin.

5. The equivalent time sampling radar according to claim 2, wherein
   the dither section includes:
   a noise generator that generates a noise; and
   a synthesizer that binarizes a synthetic waveform, which is obtained by synthesizing the reference clock generated at the reference clock generating section and the noise generated by the noise generator, at a slice level, so as to output the dither clock.

6. The equivalent time sampling radar according to claim 5, wherein
   the dither section further includes a dither amount adjuster that adjusts the changing timing of the dither clock by adjusting the frequency of the noise generated by the noise generator according to one of the frequency of the reception pulse and the frequency of the transmission pulse.

7. The equivalent time sampling radar according to claim 1, further comprising:
   an interference wave canceling section to which the long-period reception pulse generated at the sample hold section is input and that cancels pulses other than the transmission pulse as the interference wave.

8. The equivalent time sampling radar according to claim 7, wherein
   the interference wave canceling section is a low-pass filter that only passes a predetermined low-frequency band of the long-period reception pulse.

9. The equivalent time sampling radar according to claim 7, wherein
   the interference wave canceling section is a statistical processing section that performs a statistical process on the long-period reception pulse based on the sampling over a plurality of periods, and cancels the interference wave that has low temporal correlation with the sample pulse.

* * * * *